(12) United States Patent
Choi et al.

(10) Patent No.: US 12,237,485 B2
(45) Date of Patent: Feb. 25, 2025

(54) BATTERY MODULE AND BATTERY PACK INCLUDING THE SAME

(71) Applicant: LG Energy Solution, Ltd., Seoul (KR)

(72) Inventors: Jonghwa Choi, Daejeon (KR); Junyeob Seong, Daejeon (KR); Myungki Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 840 days.

(21) Appl. No.: 17/437,686

(22) PCT Filed: Oct. 13, 2020

(86) PCT No.: PCT/KR2020/013915
§ 371 (c)(1),
(2) Date: Sep. 9, 2021

(87) PCT Pub. No.: WO2021/107395
PCT Pub. Date: Jun. 3, 2021

(65) Prior Publication Data
US 2022/0166080 A1    May 26, 2022

(30) Foreign Application Priority Data
Nov. 28, 2019 (KR) .................. 10-2019-0155890

(51) Int. Cl.
*H01M 10/613* (2014.01)
*H01M 50/211* (2021.01)
*H01M 50/507* (2021.01)

(52) U.S. Cl.
CPC ....... *H01M 10/613* (2015.04); *H01M 50/211* (2021.01); *H01M 50/507* (2021.01); *H01M 2220/20* (2013.01)

(58) Field of Classification Search
CPC ............. H01M 10/613; H01M 10/617; H01M 10/655; H01M 10/6556; H01M 10/6554;
(Continued)

(56) References Cited

U.S. PATENT DOCUMENTS

2009/0297892 A1   12/2009   Ijaz et al.
2016/0380319 A1   12/2016   Rhein et al.
(Continued)

FOREIGN PATENT DOCUMENTS

CN    105469997 A    4/2016
CN    107925028 A    4/2018
(Continued)

OTHER PUBLICATIONS

International Search Report for Application No. PCT/KR2020/013915, mailing Feb. 2, 2021, 9 pages.
(Continued)

*Primary Examiner* — Christopher P Domone
(74) *Attorney, Agent, or Firm* — Lerner David LLP (57) ABSTRACT

A battery module, and a battery pack including the same, includes a battery cell stack, in which a plurality of battery cells are stacked, a module frame surrounding the battery cell stack, a busbar frame covering a part of the battery cell stack that is exposed from the module frame, a busbar connected to an electrode lead protruding from the battery cell stack through a slot formed in the busbar frame, and a heat transfer member connected to the busbar. The heat transfer members make contact with the module frame.

15 Claims, 10 Drawing Sheets

(58) Field of Classification Search
CPC ............. H01M 50/211; H01M 50/507; H01M 2220/20
See application file for complete search history.

(56) References Cited

U.S. PATENT DOCUMENTS

| | | | |
|---|---|---|---|
| 2018/0194235 A1 | 7/2018 | Kim et al. | |
| 2018/0261992 A1 | 9/2018 | Bower et al. | |
| 2019/0044201 A1 | 2/2019 | Jo et al. | |
| 2019/0074557 A1 | 3/2019 | Shin et al. | |
| 2019/0198952 A1* | 6/2019 | Choi ................. | H01M 50/209 |
| 2019/0214694 A1 | 7/2019 | Yang et al. | |
| 2019/0318892 A1 | 10/2019 | Ikejiri et al. | |
| 2019/0389318 A1 | 12/2019 | Lee et al. | |
| 2020/0044227 A1 | 2/2020 | Ryu et al. | |
| 2020/0076025 A1 | 3/2020 | Jo et al. | |
| 2020/0169069 A1 | 5/2020 | Hiramitsu et al. | |
| 2020/0189400 A1 | 6/2020 | Kim et al. | |
| 2020/0220128 A1 | 7/2020 | Kim et al. | |
| 2021/0083254 A1 | 3/2021 | You et al. | |

FOREIGN PATENT DOCUMENTS

| | | |
|---|---|---|
| CN | 108140793 A | 6/2018 |
| CN | 108496287 A | 9/2018 |
| CN | 108701791 A | 10/2018 |
| CN | 108735936 A | 11/2018 |
| JP | 2011521403 A | 7/2011 |
| JP | 2013229266 A | 11/2013 |
| JP | 201491463 A | 5/2014 |
| JP | 2015022935 A | 2/2015 |
| JP | 2017135846 A | 8/2017 |
| JP | 2019-192400 A | 10/2019 |
| KR | 20120050799 A | 5/2012 |
| KR | 20170095052 A | 8/2017 |
| KR | 20180039453 A | 4/2018 |
| KR | 20180117033 A | 10/2018 |
| KR | 20190064835 A | 6/2019 |
| KR | 20190064887 A | 6/2019 |
| KR | 2019-0078521 A | 7/2019 |
| KR | 20190083533 A | 7/2019 |
| KR | 102018719 B1 | 9/2019 |
| KR | 102034208 B1 | 10/2019 |
| WO | 2018124494 A2 | 7/2018 |
| WO | 2019203434 A1 | 10/2019 |

OTHER PUBLICATIONS

Search Report from the Office Action for Chinese Application No. 202080029453.0, Issued Aug. 31, 2023, 1 page. [See p. 1, categorizing the cited references].

Search Report dated Dec. 14, 2022 from the Office Action for Chinese Application No. 202080029453.0 issued Dec. 20, 2022, 3 pages. [See p. 2, categorizing the cited references].

* cited by examiner

BATTERY MODULE AND BATTERY PACK INCLUDING THE SAME

CROSS-REFERENCE TO RELATED APPLICATIONS

This application is a national phase entry under 35 U.S.C. § 371 of International Application No. PCT/KR2020/013915 filed on Oct. 13, 2020, which claims priority from Korean Patent Application No. 10-2019-0155890 filed on Nov. 28, 2019, the disclosure of which is incorporated herein by reference in its entirety.

TECHNICAL FIELD

The present disclosure relates to a battery module and a battery pack including the same, and more particularly to a battery module including a novel cooling structure, and a battery pack.

BACKGROUND ART

Secondary batteries, which are easily applicable to various product groups and have electrical characteristics such as high energy density, are universally applied not only for portable devices but also for electric vehicles or hybrid electric vehicles, energy storage systems or the like, which are driven by an electric driving source. Such secondary batteries are attracting attention as a new environmentally-friendly energy source for improving energy efficiency since they provide a primary advantage of remarkably reducing the use of fossil fuels and also do not generate by-products from the use of energy at all.

Small-sized mobile devices use one or several battery cells for each device, whereas middle- or large-sized devices such as vehicles require high power and large capacity. Therefore, a middle- or large-sized battery module having a plurality of battery cells electrically connected to one another is used.

Since the middle- or large-sized battery module is preferably manufactured so as to have as small a size and weight as possible, a prismatic battery, a pouch-shaped battery or the like, which can be stacked with high integration and has a small weight relative to capacity, is mainly used as a battery cell of the middle- or large-sized battery module. Such a battery module has a structure in which a plurality of cell assemblies including a plurality of unit battery cells are connected in series to obtain high output. Further, each battery cell includes a positive electrode and a negative electrode current collector, a separator, an active material, an electrolyte, and the like, and thus can be repeatedly charged and discharged by an electrochemical reaction between constituent elements.

Meanwhile, as the need for a large capacity structure is increasing along with the utilization as an energy storage source in recent years, there is a growing demand for a battery pack with a multi-module structure in which a plurality of battery modules, each including a plurality of secondary batteries connected in series and/or in parallel, are integrated.

Meanwhile, when a plurality of battery cells are connected in series or in parallel to configure a battery pack, it is common to configure a battery module composed of at least one battery cell first, and then configure a battery pack by using at least one battery module and adding other components.

Figure 1:
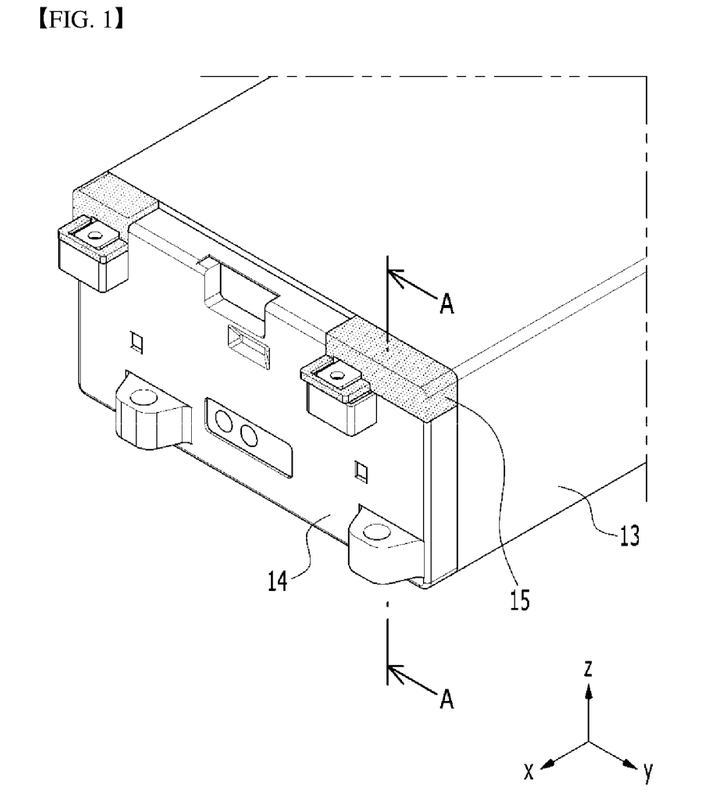
FIG. 1 is a part of a perspective view illustrating a conventional battery module.
Figure 2:
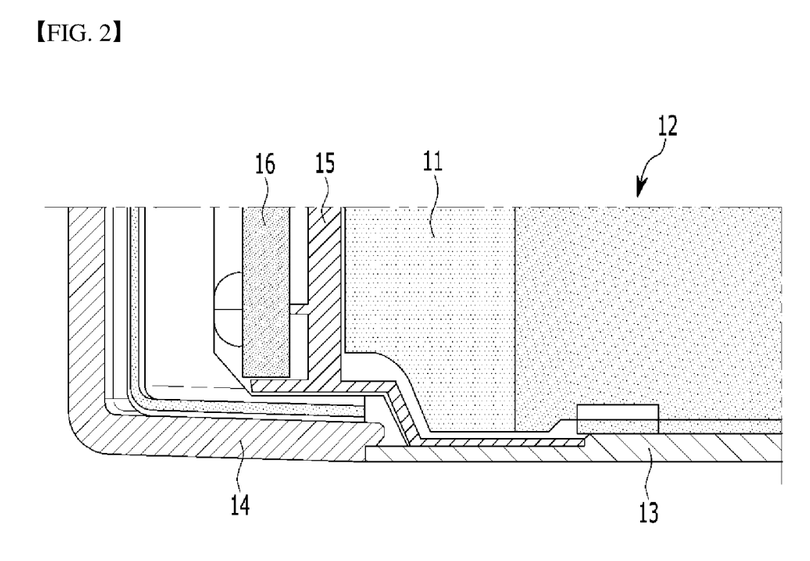
FIG. 2 is a part of a cross-sectional view taken along a xz plane with respect to cutting line A-A' of FIG. 1.

FIG. 1 is a part of a perspective view illustrating a conventional battery module. FIG. 2 is a part of a cross-sectional view taken along a XZ plane with respect to cutting line A-A' of FIG. 1.

Referring to FIGS. 1 and 2, a conventional battery module includes a battery cell assembly 12 including a plurality of battery cells 11 stacked to each other, a busbar assembly electrically connecting electrode leads of the plurality of battery cells 11, a module frame 13 surrounding the battery cell assembly 12, and an outer frame 14 covering the busbar assembly. Here, the busbar assembly includes the busbar frame 15 including lead slots which allow the electrode leads of each of the battery cells 11 to individually pass therethrough, and the busbar 16 mounted in the busbar frame 15, including the busbar slots provided to correspond to the number of the lead slots, and connected to the electrode leads passing through the busbar slots through welding and the like.

In recent years, as the needs for high capacity, high energy, and rapid charging continuously increase, an amount of a current flowing in the busbar 16 also tends to increase. Heat is generated in the bus bar due to a high current flowing into the bus bar, and it is necessary to increase a cross-sectional area of the bus bar 16 to reduce such heat generation. However, in the case of such structural changes, there is a problem that costs and weight increase.

DETAILED DESCRIPTION OF THE INVENTION

Technical Problem

It is an object of the present disclosure to provide a battery module for solving the problem of heat generation without increasing a cross-sectional area of a busbar, and a battery pack including the same.

However, the problem to be solved by embodiments of the present disclosure is not limited to the above-described problems, and can be variously expanded within the scope of the technical idea included in the present disclosure.

Technical Solution

The battery module according to an embodiment of the present disclosure includes a battery cell stack, in which a plurality of battery cells are stacked, a module frame surrounding the battery cell stack, a busbar frame covering a part of the battery cell stack that is exposed from the module frame, a busbar connected to an electrode lead protruding from the battery cell stack through a slot formed in the busbar frame, and a heat transfer member connected to the busbar, wherein the heat transfer members make contact with the module frame.

The heat transfer member may be formed of an electrically insulating and thermally conductive material.

The heat transfer members may include one of a heat transfer pad and a thermally conductive resin layer.

The heat transfer member and the busbar may be surface-bonded together.

An adhesive member may be located between the heat transfer member and the busbar.

The heat transfer member may be located between the busbar and the busbar frame.

The busbar may be located between the heat transfer member and the busbar frame.

The battery module further may include an end plate covering the busbar and the busbar frame, and the heat transfer member may be located between the end plate and the busbar.

The heat transfer member may include a first part surface-bonded to the busbar and a second part bent and extending from the first part, and the second part may make contact with a bottom part of the module frame.

The battery module may further include an end plate covering the busbar and the busbar frame, and the end plate may make contact with the first part.

The battery module may further include an insulation cover located between the end plate and the battery cell stack.

The end plate may be formed of a metal material.

The second part and the bottom part of the module frame may be located on a straight line, and an end of the second part and an end of the bottom part of the module frame may make contact with each other.

A plurality of busbars may be formed, a plurality of heat transfer members may be formed to correspond to the plurality of busbars, respectively, and the plurality of heat transfer members may be spaced apart from each other.

The battery pack according to another embodiment of the present disclosure includes the above-described battery module, a pack frame located under a bottom part of the battery module, and a heat transfer paste layer located between the bottom part of the battery module and the pack frame.

Advantageous Effects

According to the embodiments, the problem of heat generation in high current circumstances may be solved by the cooling system of the busbar having a novel form. The cooling systems for cooling the battery cell can be used to minimize increases in costs and weight because a separate cooling system is not required for cooling the busbar.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element is arbitrarily illustrated for convenience of description, and the present disclosure is not necessarily limited to that illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that it can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Figure 3:
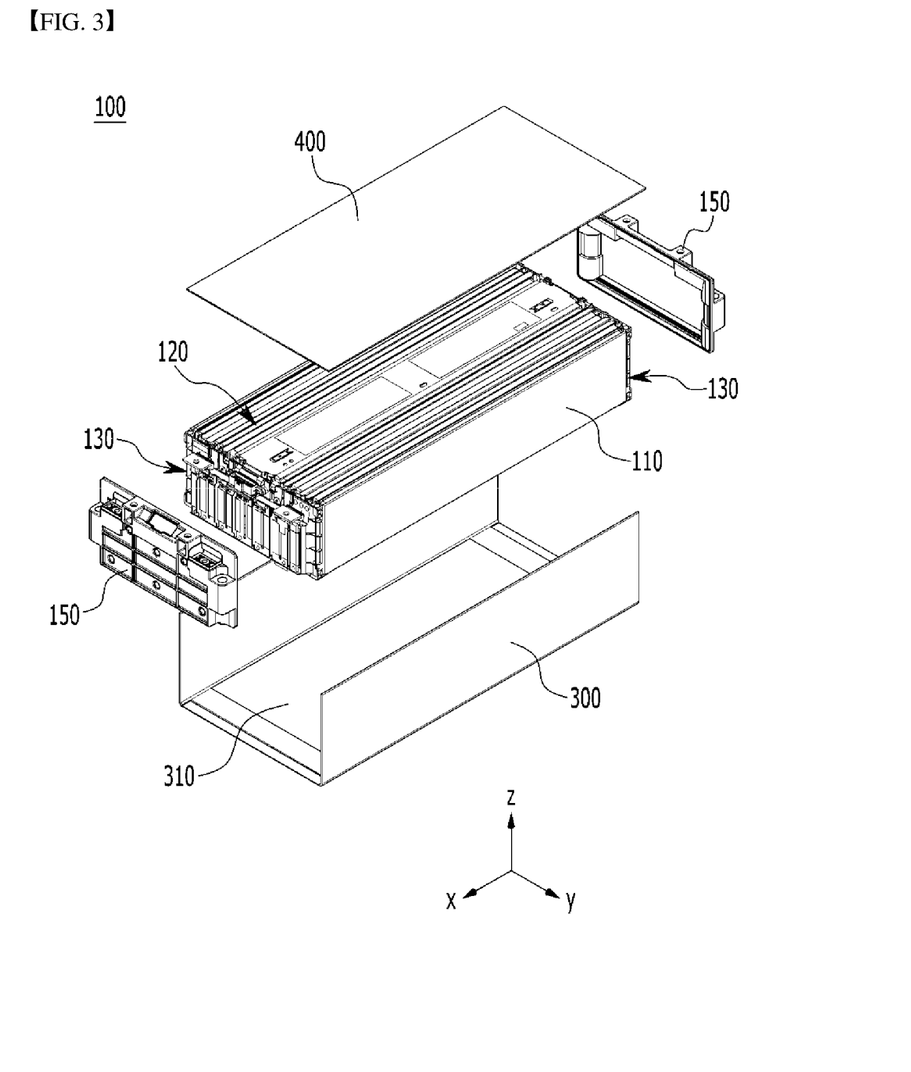
FIG. 3 is an exploded perspective view illustrating a battery module according to an embodiment of the present disclosure.
Figure 4:
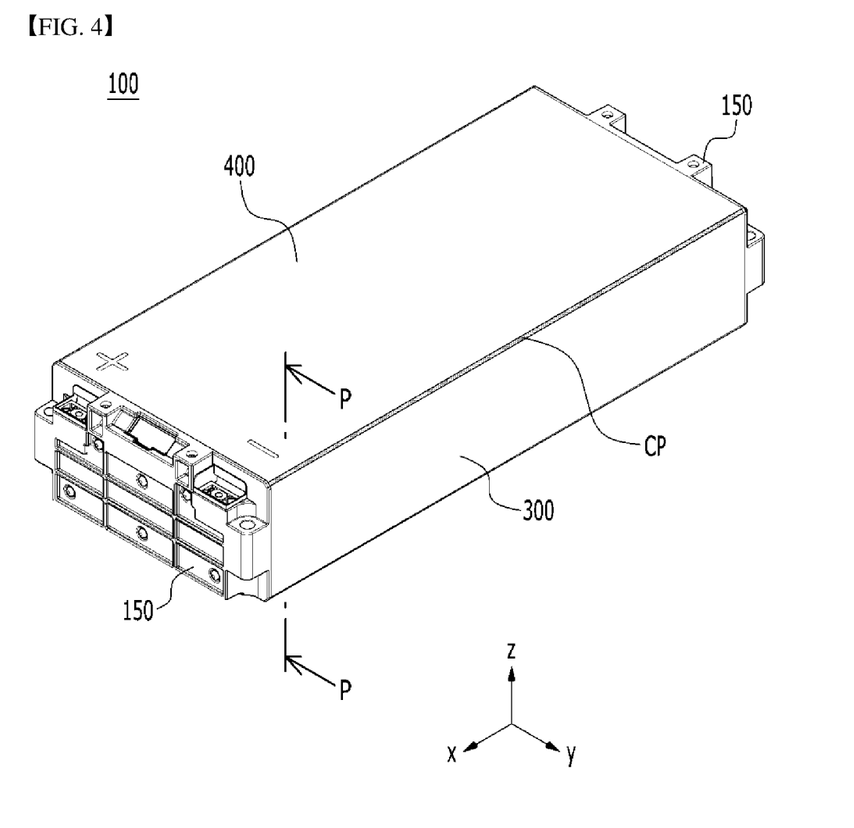
FIG. 4 is a perspective view illustrating a state in which elements of the battery module of FIG. 3 are coupled to each other.
Figure 5:
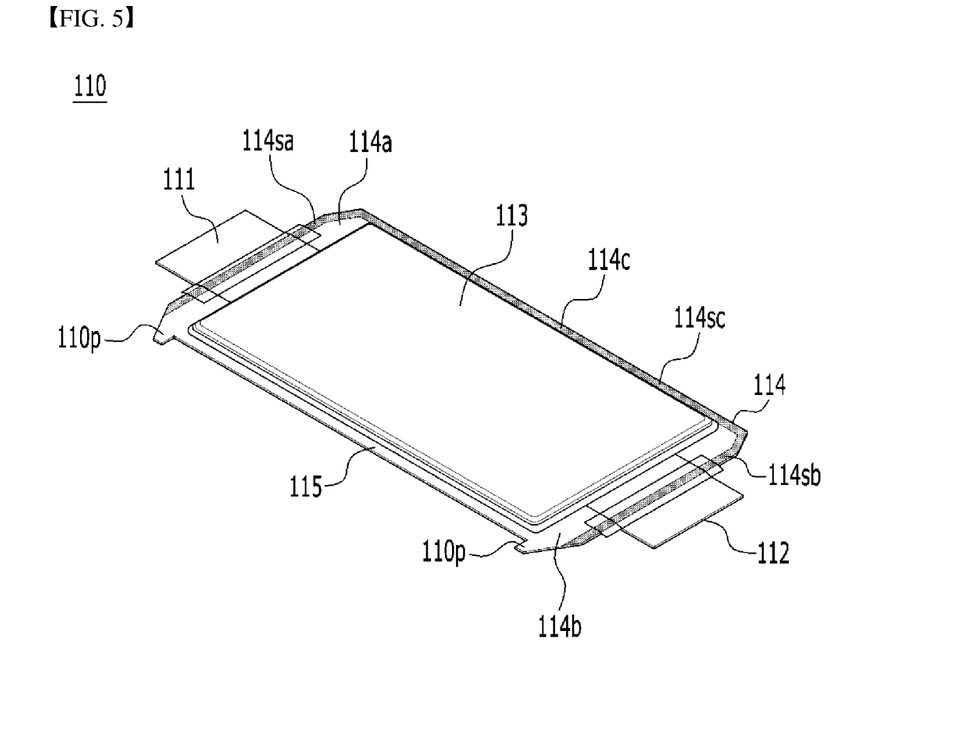
FIG. 5 is a perspective view illustrating one battery cell included in a battery cell stack of FIG. 3.
Figure 6:
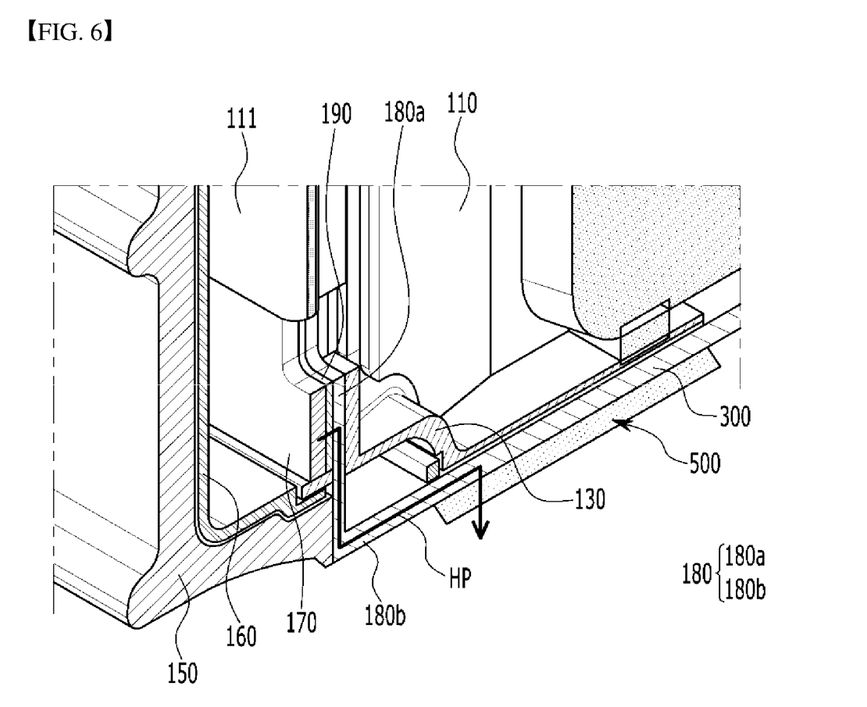
FIG. 6 is a part of a perspective view taken along the xz plane with respect to cutting line P of FIG. 4.

FIG. 3 is an exploded perspective view illustrating a battery module according to an embodiment of the present disclosure. FIG. 4 is a perspective view illustrating a state in which elements of the battery module of FIG. 3 are coupled to each other. FIG. 5 is a perspective view illustrating one battery cell included in a battery cell stack of FIG. 3. FIG. 6 is a part of a perspective view taken along the xz plane with respect to cutting line P of FIG. 4.

Referring to FIGS. 3 and 4, a battery module 100 according to the present embodiment includes the battery cell stack 120 including a plurality of battery cells 110, a U-shaped frame 300, of which an upper surface, a front surface, and a rear surface are opened, an upper plate 400 covering an upper part of the battery cell stack 120, end plates 150 each located on a front surface and a rear surface of the battery cell stack 120, and a busbar frame 130 located between the battery cell stack 120 and the end plate 150. Further, the battery module 100 includes a thermally conductive resin layer 310 located between the U-shaped frame 300 and the battery cell stack 120. The thermally conductive resin layer 310 is a kind of a heat dissipating layer, and may be formed by applying a material having a heat dissipating function. The end plate 150 may be formed of a metal material.

When it is assumed that opened opposite sides of the U-shaped frame 300 are a first side and a second side, respectively, the U-shaped frame 300 includes a plate-shaped structure bent so as to continuously cover a front surface, a lower surface and a rear surface, which are adjacent to each other, among the remaining outer surfaces except for surfaces of the battery cell stack 120 corresponding to the first side and the second side. The top surface of the U-shaped frame 300, which corresponds to the lower surface thereof, is opened.

The upper plate 400 includes a plate-shaped structure surrounding the remaining top surface except for the front surface, the lower surface, and the rear surface, which are surrounded by the U-shaped frame 300. The U-shaped frame 300 and the upper plate 400 are coupled to each other through welding and the like in a state in which corresponding edge portions thereof contact each other to form a structure covering the battery cell stack 120. That is, a coupling part (CP) may be formed at the corresponding edge portions of the U-shaped frame 300 and the upper plate 400 through a coupling method such as welding or the like.

The battery cell stack 120 includes the plurality of battery cells 110 stacked in one direction, and the plurality of the battery cells 110 may be stacked in the Y-axis direction as illustrated in FIG. 3. That is, the direction in which the plurality of battery cells 110 are stacked may be the same as the direction in which two side surface parts of the U-shaped frame 300 face each other.

It is preferable that the battery cell 110 is a pouch type battery cell. For example, referring to FIG. 5, the battery cell 110 according to the present embodiment has a structure in which two opposite electrode leads 111 and 112 protrude from one end part 114*a* and another one end part 114*b* of a battery body 113, respectively while being opposite to each other. The battery cell 110 may be manufactured by bonding opposite ends of a battery case 114*a* and 114*b*, and opposite side surfaces 114*c* connecting them while an electrode assembly (not illustrated) is received in the battery case 114. That is, the battery cell 110 according to the present embodiment includes a total of three sealing parts 114*sa*, 114*sb*, and 114*sc*, the sealing parts 114*sa*, 114*sb*, and 114*sc* are sealed in a method such as thermosetting, and a remaining another side part may have a connecting part 115. A section between the opposite ends 114*a* and 114*b* of the battery case 114 may be defined as a lengthwise direction of the battery cell 110, and a section between one side part 114*c* connecting the opposite ends of the battery case 114, and the connecting part 115 may be defined as a widthwise direction of the battery cell 110.

The connecting part 115 is an area extending along one periphery of the battery cell 110, and a protrusion part 110*p* of the battery cell 110 may be formed at an end of the connecting part 115. The protrusion part 110*p* may be formed at at least one of opposite ends of the connecting part 115, and may protrude in a direction that is perpendicular to a direction in which the connecting part 115 extends. The protrusion part 110*p* may be located between one of sealing parts 114*sa* and 114*sb* of opposite ends 114*a* and 114*b* of the battery case 114, and the connecting part 115.

The battery case 114 is generally formed of a laminate structure of a resin layer/a metal thin film layer/a resin layer. For example, if a surface of the battery case is formed of an oriented (O)-nylon layer, a surface of the battery case tends to easily slip due to an external impact when the plurality of battery cell are stacked to form a middle/large-sized battery module. Accordingly, in order to prevent this and maintain a stable stacked structure of the battery cells, the battery cell stack 120 may be formed by attaching an adhesive member such as a viscous adhesive of a double side paper or a chemical adhesive coupled due to a chemical reaction during bonding on a surface of the battery case. In the present embodiment, the battery cell stack 120 is stacked in the Y-axis direction, and is accommodated in a U-shaped frame 300 in the Z-axis direction so that the battery cell stack 120 may be cooled by a thermally conductive resin layer which will be described below. In a comparative example for the present embodiment, the battery cell is formed of cartridge-shaped components so that the battery cells may be fixed by assembling a frame of the battery module. In the comparative example, a cooling operation may be hardly performed or may progress in a surface direction of the battery cell due to existence of the cartridge-shaped components and may not progress in a heightwise direction of the battery module.

Referring to FIG. 3 again, the U-shaped frame 300 according to the present embodiment includes a bottom part 300*a* and two side surface parts 300*b* facing each other, which are connected to each other by the bottom part. Before the battery cell stack 120 is mounted on the bottom part of the U-shaped frame 300, the thermally conductive resin layer 310 may be formed by applying a thermally conductive resin on the bottom part of the U-shaped frame 300 and curing the thermally conductive resin. The thermally conductive resin layer 310 may be located between the bottom part of the U-shaped frame 300 and the battery cell stack, and may function to transfer heat generated from the battery cell 110 to a bottom of the battery module 100, and fix the battery cell stack 120.

Referring to FIGS. 4 and 6, the battery module 100 according to the present embodiment includes the busbar frame 130 covering a part of the battery cell stack 120, which is exposed from the module frame including the U-shaped frame 300 and the upper plate 400, the busbar 170 connected to the electrode lead 111 protruding from the battery cell stack 120 through a slot formed in the busbar frame 130, and a heat transfer member 180 connected to the busbar 170. Here, the heat transfer member 180 makes contact with the module frame. In detail, the U-shaped frame 300 included in the module frame may make contact with the heat transfer member 180.

The heat transfer member 180 according to the present embodiment may be formed of an electrically insulating and thermally conductive material. In detail, the heat transfer member 180 may include one of a heat transfer pad and a thermally conductive resin layer. The heat transfer member 180 may be surface-bonded to the busbar 170 and the surface bonding may be made by the adhesive member 190 located between the heat transfer member 180 and the busbar 170. The adhesive member 190 may be a double-sided tape. The heat transfer member 180 may be located between the busbar 170 and the busbar frame 130.

An insulation cover 160 may be disposed between the end plate 150 and the battery cell stack 120.

Figure 7:
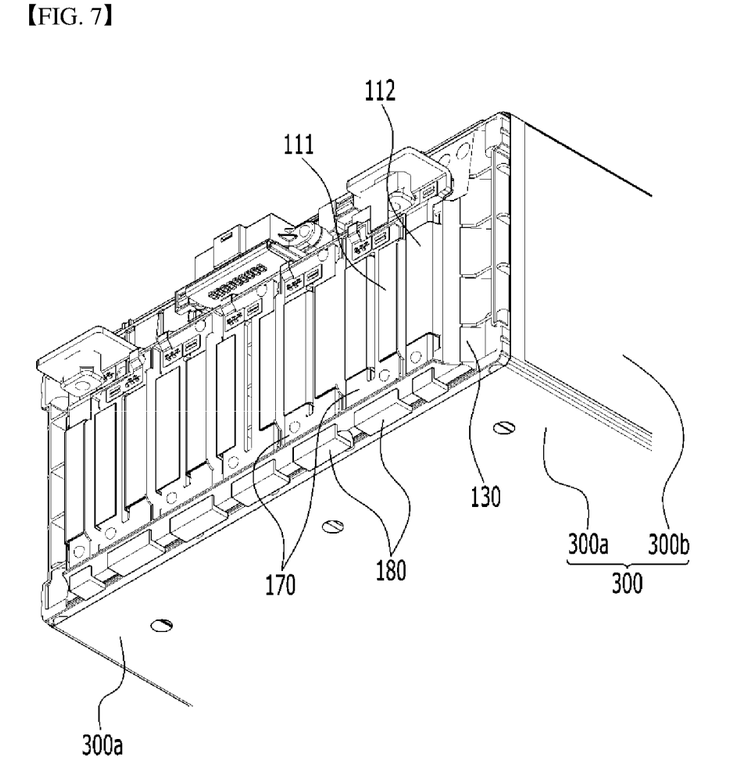
FIG. 7 is a perspective view illustrating the battery module of FIG. 4, in which some of outskirt elements are removed.

FIG. 7 is a perspective view illustrating the battery module of FIG. 4, in which some of outskirt elements are removed.

Referring to FIG. 7, a plurality of busbars 170 according to the present embodiment may be formed and a plurality of heat transfer members 180 may be formed to correspond to the plurality of busbars 170, respectively. Here, the plurality of heat transfer members 180 may be spaced apart from each other. However, the present disclosure is not limited thereto and the plurality of heat transfer members 180 may be connected to each other along the Y-axis direction of FIG. 3 to be integrally formed.

Figure 8:
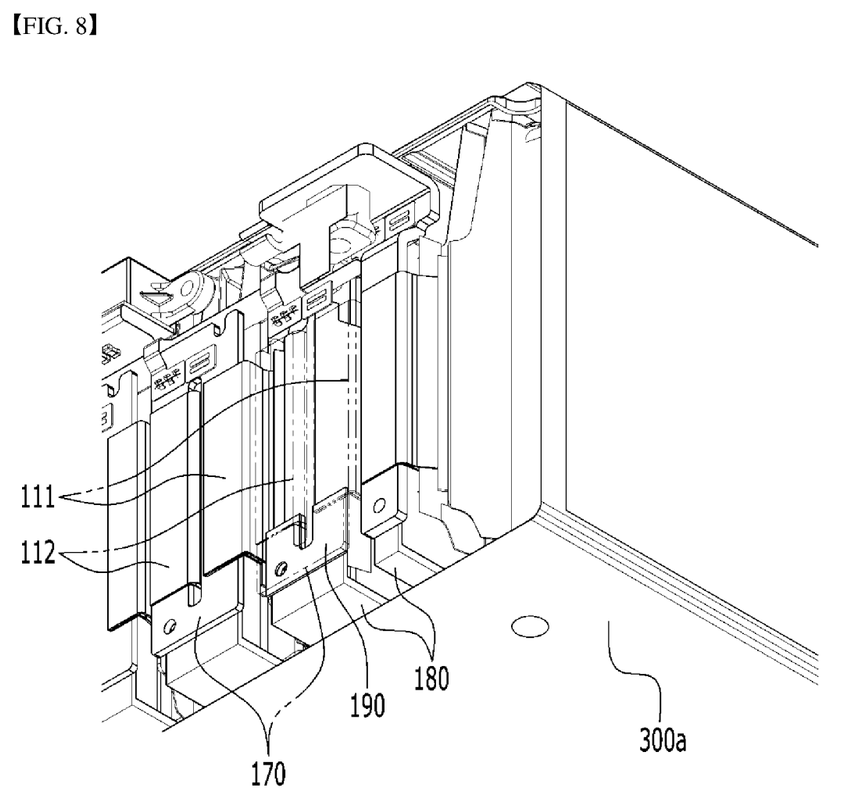
FIG. 8 is a partially enlarged perspective view of FIG. 7 in which a busbar frame, and one structure connecting busbars and electrode leads are removed.
Figure 9:
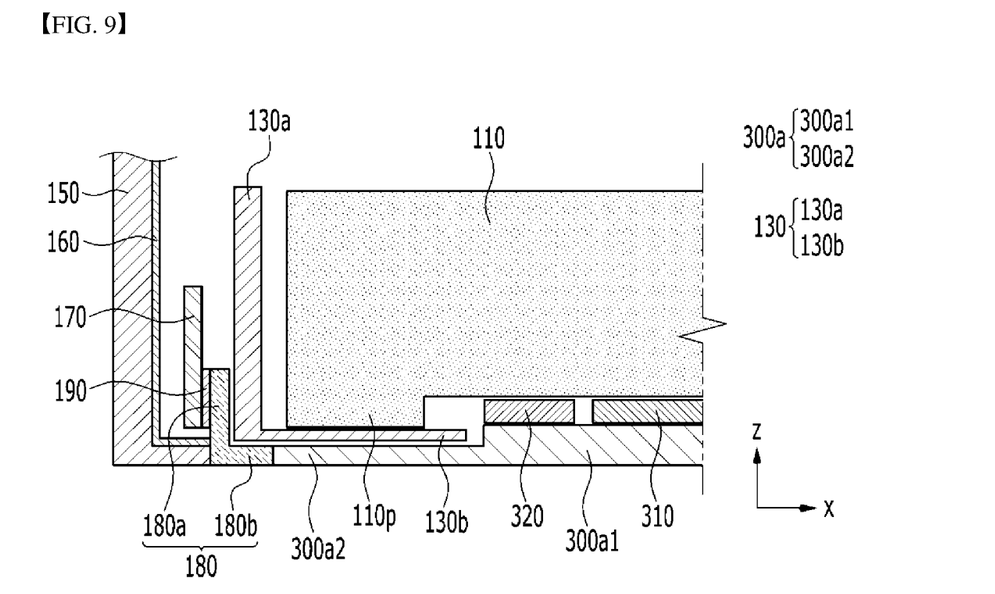
FIG. 9 is a cross-sectional view taken along the xz plane in a lengthwise direction of a battery cell stack in FIG. 4.

FIG. 8 is a partially enlarged perspective view of FIG. 7 in which a busbar frame, and one structure connecting busbars and electrode leads are removed. FIG. 9 is a cross-sectional view taken along the xz plane in a lengthwise direction of the battery cell stack in FIG. 4.

Referring to FIGS. 8 and 9, the electrode leads 111 and 112 protruding from the battery cell 110 pass through the slots formed in the busbars 170 to be bent onto the busbars 170 and the electrode leads 111 and 112 may be coupled to the busbars 170 through welding and the like. In addition, the electrode leads 111 and 112 pass through a space between adjacent busbars 170 to be bent onto the busbars 170 and the electrode leads 111 and 112 may be coupled to the busbars 170 through welding and the like.

The busbar frame 130 according to the present embodiment includes a main frame 130*a* disposed to be perpendicular to a direction in which the electrode lead 111 and 112 described in FIG. 5 protrudes, and a bending part 130*b* extending from a lower part of the main frame 130*a*. The busbar frame 130 is connected to the battery cell stack 120 as described in FIG. 3. The bending part 130*b* may be bent by approximately 90 degrees with respect to the main frame 130*a* to be located on the bottom part 300*a* of the U-shaped frame 300.

The battery cell 110 according to the present embodiment may include a protrusion part 110*p* formed in a widthwise direction thereof and the protrusion part 110*p* may be located on the bending part 130*b*. Here, a widthwise direction of the battery cell 110 may be the Z-axis direction of FIG. 9. The bottom part 300*a* of the U-shaped frame according to the present embodiment further includes a second part 300*a*2 located on the outside of the first part 300*a*1 in a lengthwise direction of the battery cell stack 120. That is, the second part 300*a*2 is located at a periphery of the battery cell stack 120 with respect to a lengthwise direction of the battery cell 110, and the first part 300*a*1 is located inside the second part 300*a*2. Here, it is preferable that the thickness of the second part 300*a*2 is smaller than the thickness of the first part 300*a*1. Here, a lengthwise direction of the battery cell 110 may be the X-axis direction of FIG. 9.

In the present embodiment, the bending part 130*b* of the busbar frame 130 is located on the second part 300*a*2 of the bottom part 300*a* of the U-shaped frame 300. Here, it is preferable that the total thickness of the thickness of the bending part 130*b* and the thickness of the second part 300*a*2 is smaller than the thickness of the first part 300*a*1. This is because the protrusion part 110*p* of the battery cell 110 is caught by steps of the second part 300*a*2 and the first part 300*a*1 to be prevented from moving due to an external impact. In addition, a gap between the battery cell 110 and a frame may be reduced through machining of the bottom part 300*a* of the U-shaped frame, and such a gap reducing effect may cause the gap reducing effect obtained by heightwisely assembling the battery module together with a synergy effect to maximize overall space efficiency. Due to the machining of the bottom part 300*a* of the U-shaped frame, even a step of the bottom part 300*a* may be formed at the same time while a U-shaped frame structure is formed. The press molding, numerical control work (NC) processing, or the like may be used for forming the step.

The pad part 320 is located between the first part 300*a*1 of the bottom part 300*a* and the battery cell 110, and the thermally conductive resin layer 310 is located inside the pad part 320. That is, the pad part 320 may be located between the thermally conductive resin layer 310 and the second part 300*a*2 of the bottom part 300*a* to guide an application location of the thermally conductive resin or prevent the thermally conductive resin from overflowing the outside of the bottom part 300*a*. Further, without the pad part 320 according to the present embodiment, an unintended defect may be formed if the thermal conductive resin excessively overflows to unnecessary parts and is solidified.

In the present embodiment, the heat transfer member 180 includes the first part 180*a* surface-bonded to the busbar 170 and the second part 180*b* bent so as to extend from the first part 180*a*. Here, the second part 180*b* may make contact with the bottom part 300*a* of the U-shaped frame 300 included in the module frame. The second part 180*b* of the heat transfer member 180 and the bottom part 300*a* of the U-shaped frame 300 are on a straight line, and an end of the second part 180*b* of the heat transfer member 180 and an end of the bottom part 300*a* of the module frame may make contact with each other. A tolerance that occurs when the battery cell stack 120 is mounted in the interior of the module frame may be minimized by the structure. Further, the busbar 170 and the end plate 150 covering the busbar frame 130 may make contact with the first part 180*a* of the heat transfer member 180.

In this way, in the battery module structure according to the present embodiment, according to a heat transferring path (HP) illustrated in FIG. 6, heat generated from the busbar 170 may be transferred to the heat transfer member 180 connected to the busbar 170, and heat of the heat transfer member 180 may be transferred to the U-shaped frame 300 formed of a metal material, for cooling. Thereafter, the cooling function due to the heating of the bus bar 170 may be performed by a cooling system of the battery module according to the present embodiment. The cooling system will be additionally described with reference to FIG. 10.

Figure 10:
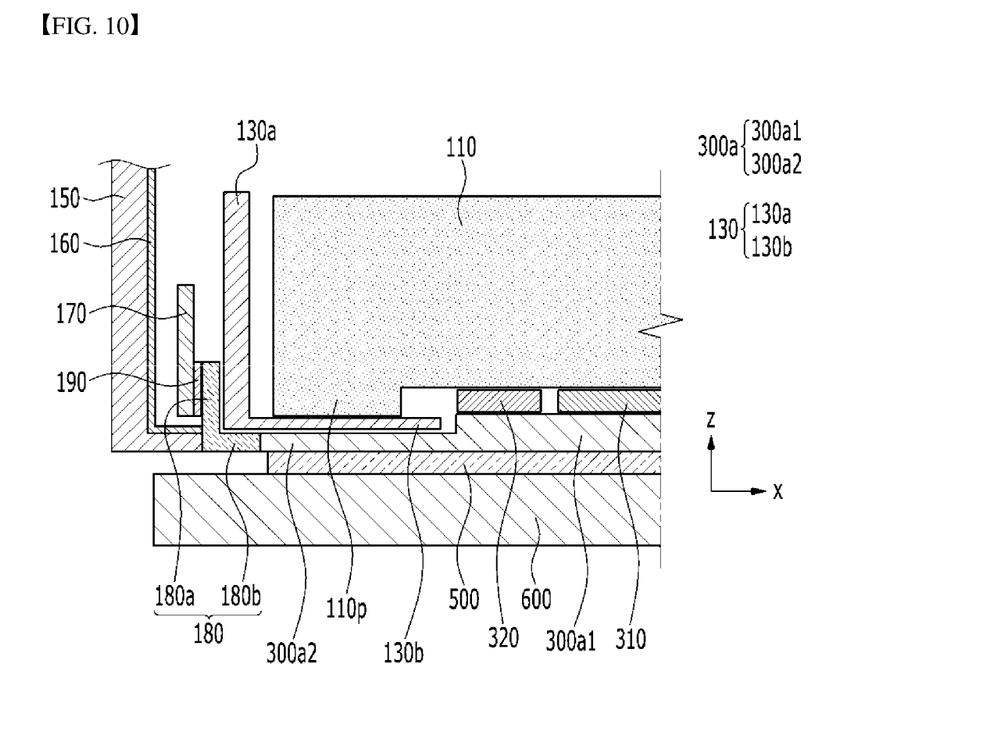
FIG. 10 is a cross-sectional view illustrating a battery pack according to another embodiment of the present disclosure.

FIG. 10 is a cross-sectional view illustrating a battery pack according to another embodiment of the present disclosure.

Referring to FIG. 10, the battery pack according to the present embodiment includes the above-mentioned battery module, a pack frame 600 located under the bottom part of the battery module, and a heat transfer paste layer 500 located between the bottom part of the battery module and the pack frame 600. The pack frame 600 may include a cooling system, which is an existing well-known cooling system such as a heat sink, or which is disposed separately from the pack frame 600.

The cooling system may perform a function of cooling the heat generated from the battery cell 110 of the battery module. According to the present embodiment, because of the structure for cooling heat generated from the busbar 170 as well as heat generated from the battery cell 110, a separate cooling system for cooling the busbar 170 is not necessary. According to the related art, a large cross-sectional area increases weight and costs in order to solve the heating problem of busbar 170, but the cross-sectional area of the bus bar 170 also may be reduced according to the present disclosure.

Figure 11:
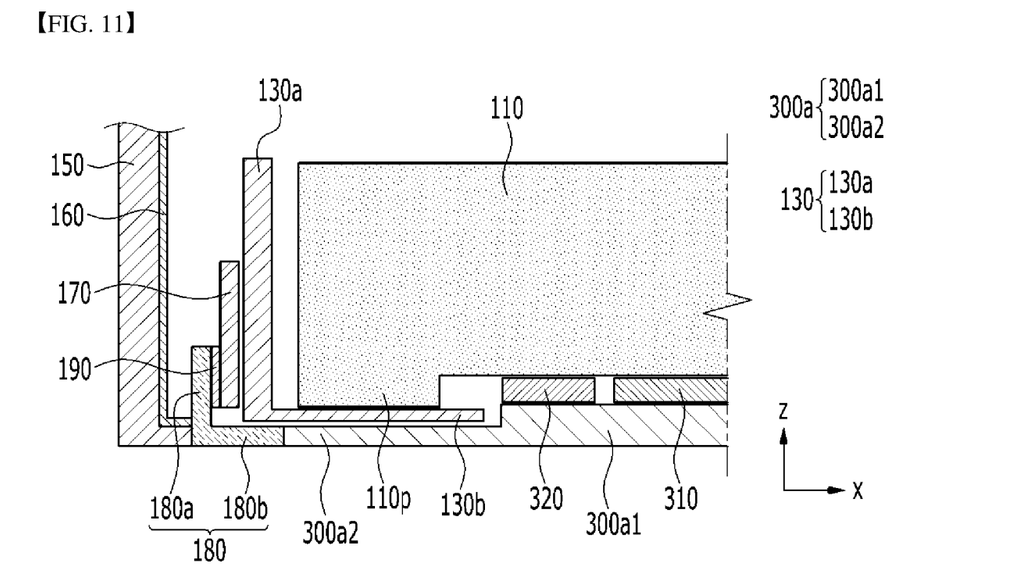
FIG. 11 is a cross-sectional view illustrating a battery module according to another embodiment of the present disclosure.

FIG. 11 is a cross-sectional view illustrating a battery module according to another embodiment of the present disclosure.

Most of the elements in FIG. 11 are the same as those of the embodiments described in FIG. 9, only different parts having a difference will be described below.

Referring to FIG. 11, the busbar 170 included in the battery module according to the present embodiment is located between the heat transfer member 180 and the busbar frame 130. That is, the heat transfer member 180 may be located between the busbar 170 and the end plate 150 covering the busbar 170 and the busbar frame 130.

Except for the above-described differences, all the description for the battery module described in FIG. 9 is applicable to the present embodiment.

Figure 12:
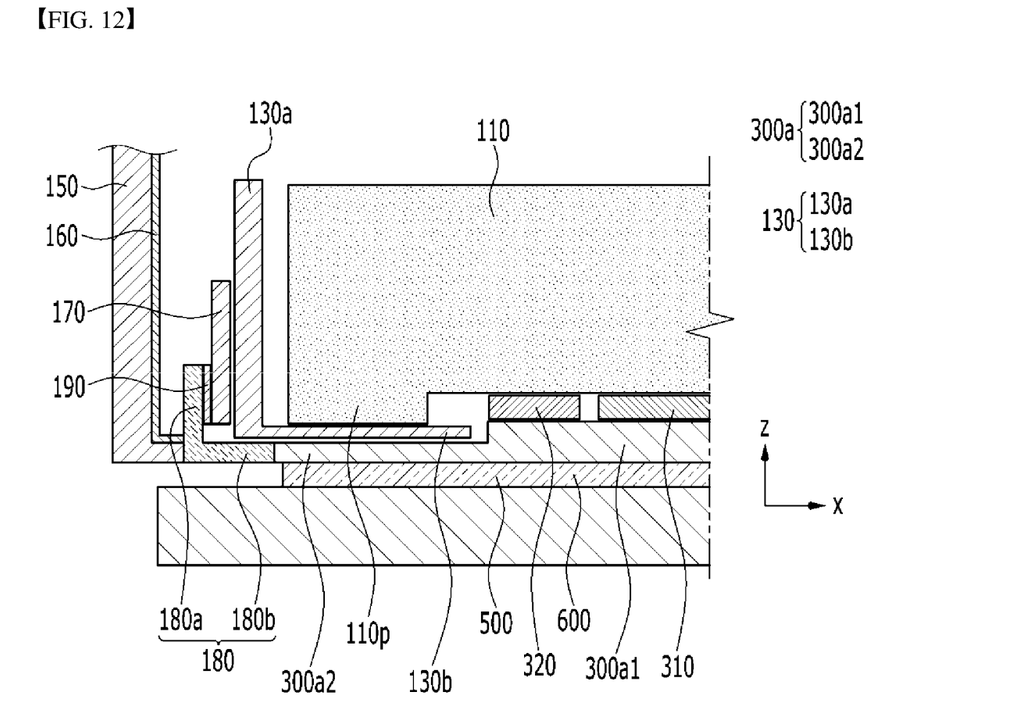
FIG. 12 is a cross-sectional view illustrating the battery pack structure including the battery module of FIG. 11.

FIG. 12 is a cross-sectional view illustrating the battery pack structure including the battery module of FIG. 11.

Referring to FIG. 12, the battery pack according to the present embodiment include the battery module described in FIG. 10, a pack frame 600 located under the bottom part of the battery module, and a heat transfer paste layer 500 located between the bottom part of the battery module and the pack frame 600. The pack frame 600 may include a cooling system, which is an existing well-known cooling system such as a heat sink, or which is disposed separately from the pack frame 600.

The above-mentioned battery module or the battery pack including the same can be applied to various devices. These devices may be applied to transportation means such as an electric bicycle, an electric vehicle, a hybrid vehicle, but the present disclosure is not limited thereto and can be applied to various devices that can use the battery module or the battery pack including the same.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
170: busbar
180: heat transfer member
190: adhesive member
300: U-shaped frame
400: upper plate

The invention claimed is:

1. A battery module comprising:
a battery cell stack, in which a plurality of battery cells are stacked;
a module frame surrounding the battery cell stack;
a busbar frame covering a portion of the battery cell stack that is exposed from within the module frame;
a busbar connected to an electrode lead protruding from the battery cell stack, the electrode lead passing through a slot formed in the busbar frame; and
a heat transfer member connected to the busbar,
wherein the heat transfer member contacts the module frame.

2. The battery module of claim 1,
wherein the heat transfer member is formed of an electrically insulating and thermally conductive material.
3. The battery module of claim 2,
wherein the heat transfer member comprises one of a heat transfer pad and a thermally conductive resin layer.
4. The battery module of claim 3,
wherein the heat transfer member and the busbar are surface-bonded together.
5. The battery module of claim 4,
wherein an adhesive member is located between the heat transfer member and the busbar.
6. The battery module of claim 1,
wherein the heat transfer member is located between the busbar and the busbar frame.
7. The battery module of claim 1,
wherein the busbar is located between the heat transfer member and the busbar frame.
8. The battery module of claim 7, further comprising:
an end plate covering the busbar and the busbar frame,
wherein the heat transfer member is located between the end plate and the busbar.
9. The battery module of claim 1,
wherein the heat transfer member comprises a first part surface-bonded to the busbar and a second part extending transversely to the first part, and
the second part contacting a bottom part of the module frame.
10. The battery module of claim 9, further comprising:
an end plate covering the busbar and the busbar frame,
wherein the end plate contacts the first part.
11. The battery cell stack module of claim 10, further comprising:
an insulation cover located between the end plate and the battery cell stack.
12. The battery module of claim 10,
wherein the end plate is formed of a metal material.
13. The battery module of claim 9,
wherein the second part and the bottom part of the module frame extend collinearly with one another, and wherein an end of the second part and an end of the bottom part of the module frame contact one another.
14. The battery module of claim 1, further comprising a plurality of the busbars, and a plurality of the heat transfer members, each of the plurality of the heat transfer members corresponding to a respective one of the plurality of busbars, and wherein each of the heat transfer members of the plurality of heat transfer members are spaced apart from one another.
15. A battery pack comprising:
the battery module of claim 1;
a pack frame located under a bottom part of the battery module; and
a heat transfer paste layer located between the bottom part of the battery module and the pack frame.

* * * * *